United States Patent [19]

Celi

[11] Patent Number: 5,522,153
[45] Date of Patent: Jun. 4, 1996

[54] DEVICE AND PROCESS FOR PRE-TREATING ELECTRONIC CIRCUIT SCRAPS

[76] Inventor: Antonio M. Celi, Localita Paduni-Casarene, Anagni, Frosinone, Italy

[21] Appl. No.: 317,578

[22] Filed: Oct. 4, 1994

[30] Foreign Application Priority Data

Oct. 7, 1993 [IT] Italy ................. RM93A0677

[51] Int. Cl.⁶ .................................................. F26B 17/12
[52] U.S. Cl. ................. 34/178; 34/168; 34/172
[58] Field of Search .................. 34/168, 169, 172, 34/173, 178

[56] References Cited

U.S. PATENT DOCUMENTS

| | | | |
|---|---|---|---|
| 1,796,324 | 3/1931 | Farnham | 34/172 |
| 1,880,284 | 10/1932 | Schenk | 34/172 |
| 4,337,584 | 7/1982 | Johnson | 34/169 |
| 4,619,606 | 10/1986 | Numberger | 34/168 |
| 4,629,421 | 12/1986 | Kriesberg et al. | 34/168 |
| 4,752,359 | 7/1988 | Sundermann et al. | 34/172 |

FOREIGN PATENT DOCUMENTS

| | | |
|---|---|---|
| 0094928 | 11/1983 | European Pat. Off. |
| 2668167 | 4/1992 | France |
| 2032720 | 1/1972 | Germany |
| 4018607 | 2/1992 | Germany |

*Primary Examiner*—John T. Kwon
*Attorney, Agent, or Firm*—Young & Thompson

[57] ABSTRACT

A device for pre-treating electronic circuit scraps has a conduit placed at a slope to the vertical direction. Also, some counter-rotating disk wheels are arranged in a cascade and bear grid-like vanes. These wheels begin at an upper end where the scraps are introduced through an inlet and extend down to a lower end where a scrap outlet is located. The inlet and the outlet for the scraps are made up of rotatable doors. The inlet has a loading opening and the outlet has a discharge conveyor. Air barriers may be interposed at the inlet and the outlet. The conduit includes an element that causes the heat-exchange fluid to circulate inside from the lower end to the upper end. A process for pre-treating the electronic circuit scraps has several steps: first, carrying out a treatment in an oven including the above-mentioned device; second, carrying out a treatment of plastic materials and metals in a refrigerator including the above-mentioned device; third, burning outlet air; and fourth, burning outlet heat-exchange fluid.

12 Claims, 3 Drawing Sheets

5,522,153

DEVICE AND PROCESS FOR PRE-TREATING ELECTRONIC CIRCUIT SCRAPS

BACKGROUND OF THE INVENTION

1. Field of the Invention

This invention relates to the field of treatment of electronic circuit scraps.

More specifically, this invention relates to a device fore pre-treating electronic circuit scraps.

This invention further refers to a process for pre-treating electronic circuit scraps, that employs such kind of device.

By the term "pre-treating" it is meant in the present disclosure a treatment suitable to allow a subsequent recovery of their components, and particularly by which metals contained in the electronic circuit scraps are not already recovered, but these metals can be transformed into metal ions and then afterwards they can be recovered as electrolytic metals in a successive process.

2. Description of the Related Art

Circuit electronic scraps, regardless of their origin (computers, televisions, radio, telephonic systems, etc.) have showed themselves, when discharged, as a danger not to be disregarded for the environment wherein we live, without speaking of the fact that enormous quantities of metals which might become in time no longer available are so irreparably lost.

Therefore, the Applicant of the present application had already previously suggested a device able to treat such scraps so that it would be possible to recover metal contained in them.

Briefly, it provided an encounter of the electronic circuit scraps with a heat-exchange fluid at a high temperature for separating the various constituent components.

However, such device, has two fundamental drawbacks.

First, by means of it the quantity of unrecovered metal is considerable.

Second, during its operation at high temperature there is no safety against leakages from it of polluting gases into the atmosphere, some of which, even if in very small quantities, are extremely dangerous, such as for instance dioxines, bromine vapors, mercury vapors, phenols, and the like.

SUMMARY OF THE INVENTION

It is the object of this invention to provide a device for pre-treating electronic circuit scraps suitable to allow a subsequent substantially complete recovery of their components, and particularly of metals in them contained.

Its features consist in that it is able to realize an encounter between the electronic circuit scraps and the heat-exchanger fluid, which encounter is substantially more intimate than in the known device above, and to heat up the electronic circuit scraps to such a temperature for obtaining the removal of the solder and for causing the protective lacquers that act as a mantle of the individual components of the scrapped material to wrinkle, so leaving the metal of every component substantially bare.

It is a further object of the present invention to provide a device of pre-treatment of electronic circuit scraps of such a type, that it is also safe towards the environment, that is to say which is safe against escapes of gases generating inside the same during operation at high temperature.

Such object is attained by means of a device as mentioned before, which further contains an inlet barrier air and an outlet barrier air.

It is a further object of the present invention to provide a process for pre-treating electronic circuit scraps, which process makes use of the device according to the present invention.

Therefore, this invention refers to a device for pre-treating electronic circuit scraps, comprising:

a conduit placed at a slope to the vertical direction;

means for circulating the heat-exchange fluid from the lower end to the upper end of said conduit;

which conduit comprising in its inside part a plurality of grid-like vane disk wheels, which are cascade arranged from the upper end to the lower end of said conduit and are counter-rotating;

means for introduction into the inlet at the upper end of said conduit of electronic circuit scraps, comprising:

a loading rotatable door, which is assembled in a loading sealed cylinder bearing an upper opening and a lower opening which are such as to cause one and only one sector of said rotatable door to communicate simultaneously with the outside and another sector and just this other sector of said rotatable door to communicate with the inside of said conduit, and a loading opening which communicates with said upper opening of said loading cylinder;

outlet means for the electronic circuit scraps which have been processed at the lower end of said conduit, comprising:

a discharge rotatable door which is assembled within a discharge sealed cylinder bearing an upper opening and a lower opening which are such as to cause one and only one sector of said rotatable door to communicate simultaneously with the inside part and another and this only other sector of said rotatable door to communicate with the outside of said conduit, and a discharge conveyor which communicates with said lower opening of said discharge cylinder, and means for removing air introduced from the outside of the conduit through said rotatable doors and means for reintroduction into said conduit of the heat-exchange fluid introduced through said rotatable doors from the inside of the conduit during the operation of the device.

According to a preferred embodiment, said disk wheels and said loading and discharge rotatable doors are each made up of four vanes, each one assembled in the shape of a cross joint on the respective shafts.

Particularly, it is foreseen that said disk wheels rotate within the full space inside said conduit.

Moreover, it is foreseen that said disk wheels end in a swastika shape whose sense is opposite to that of rotation.

It is also foreseen that baffles are arranged below each one of said disk wheels.

This invention also relates to a device fore pre-treating electronic circuit scraps according to what has been set forth, in which device between said loading opening and said loading cylinder of said conduit, an air barrier is provided, and between said discharge conveyor and said discharge cylinder of said conduit an air barrier is provided.

It is contemplated that such device comprises a circuit for recirculating and washing the heat-exchange fluid towards said conduit.

It is further contemplated that in such recirculation circuit a fresh heat-exchange fluid reservoir is inserted.

It is foreseen that said heat-exchange fluid is nitrogen.

Moreover, this invention refers to a device according to what has been set forth, in which device further said discharge conveyor is endowed with means for collecting solder employed for electronic circuits, as well as with means for conveying elastic materials and metals.

At last it is foreseen that said heat-exchange fluid is air.

This invention also refers to a process for pre-treating electronic circuit scraps, which process comprises the steps of:

(I) carrying out the treatment within a rotating oven which is made up of a device according to this invention;

(II) carrying out the treatment of plastic materials and metals at the outlet from such a treatment, in a refrigerator which is made up of a device according to this invention;

(III) burning the outlet air, and (IV) burning the outlet heat-exchange fluid.

BRIEF DESCRIPTION OF THE DRAWINGS

This invention will be best understood on the basis of the following detailed disclosure of its preferred embodiment, which is given just for illustrative, absolutely not limitative purposes, with reference to the accompanying drawings, in which drawings.

DETAILED DESCRIPTION OF THE PREFERRED EMBODIMENT

Figure 1:
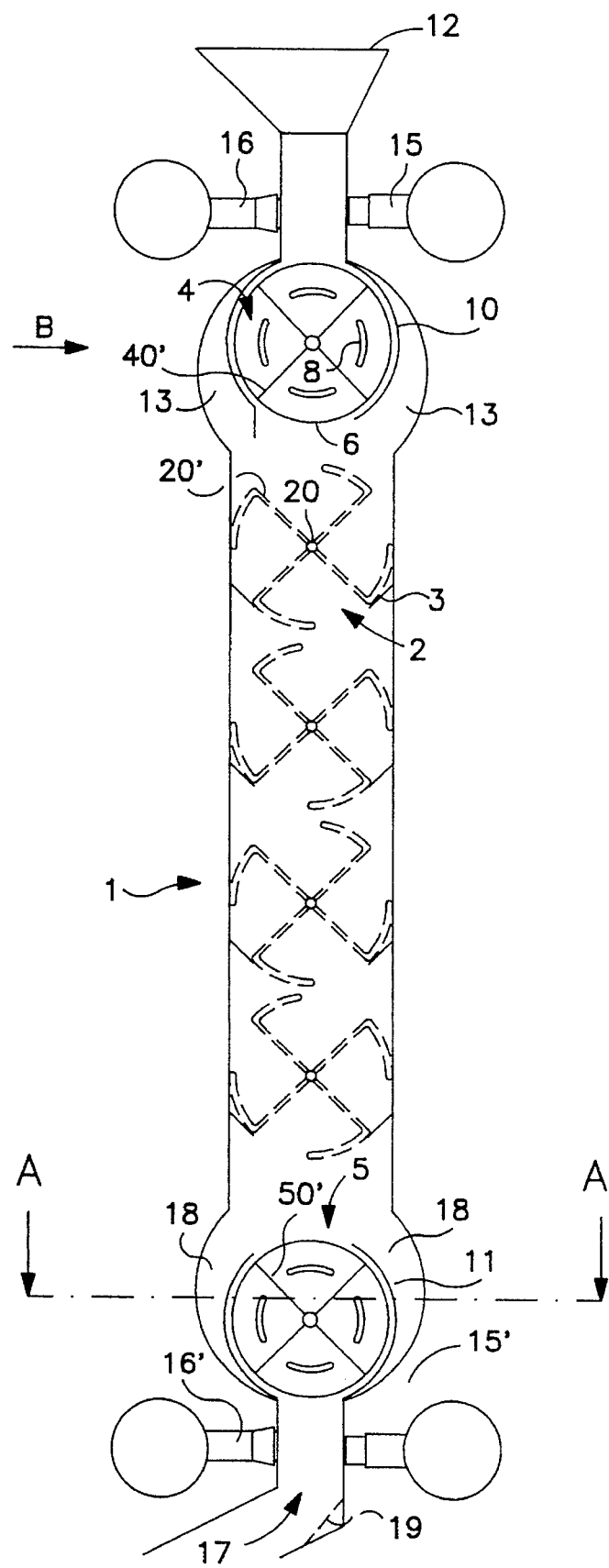
FIG. 1 is a longitudinal sectional view of the device for pre-treating electronic circuit scraps according to the present invention.

In a conduit 1 having a square or rectangular cross section, which in the following in this disclosure is reported as "work conduit", and having a suitable section and length to the foreseen treatment capability, which is placed at a suitable slope to the vertical direction, on a longitudinal plane in the middle between two walls of said conduit 1, a plurality of load bearing disk wheels 2 which are assembled in the shape of a cross joint, or simply cross joints, which are made up of shafts 20 on which four (4) vanes 20' for each shaft are secured in the shape of a cross. The load bearing cross joints 2 are so placed to interest all the length of the work conduit 1 and they are in a number enough to effect the functions they are predisposed for, and they are placed at a distance one from another so that to obtain a falling of a given strength.

The vanes of the load bearing cross joints 2, which vanes have a grid-like surface, so that they cannot act as a windscreen in any case, have a length equal to the inner sides of the work conduit 1 cross section and such a width so that the sum of two of them and of the shaft diameter on which said vanes are secured equally gives the size of the sides of the same (cross joint diameter). The load bearing cross joints 2 have profiles in a swastika shape which are alternatively clockwise and anti-clockwise oriented and each one rotates about its axis 20 in a sense opposite to that of the preceding one and of the next one, or they are "counter-rotating". More precisely, the clockwise cross joints rotate in a anti-clockwise sense and the anti-clockwise cross joints rotate in a clockwise sense. Below each load bearing cross joint 2, in the direction of its rotation axis and tangentially to it, on both the work conduit 1 two sides and for the whole length of the load bearing cross joint 2 itself, baffles 3 are placed as a windscreen.

Figure 2:
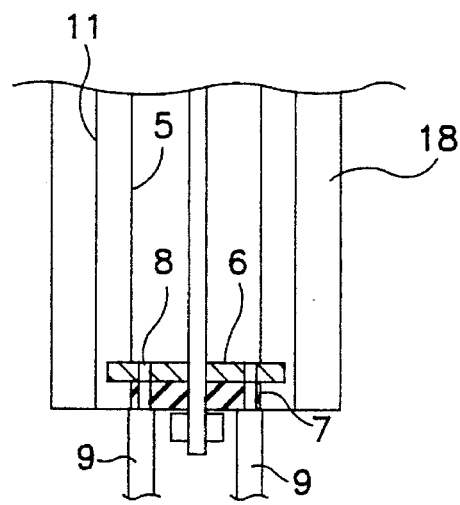
FIG. 2 is a sectional view along the A—A line in FIG. 1.

At the upper and lower ends of the work conduit 1, instead, respectively a load cross joint 4 and a discharge cross joint 5 are provided, which are no more in the shape of a grid and have not a profile in the shape of a swastika. They are provided with sealed lateral disks 6 having the same diameter of said cross joints. These disks 6 have on their surface toward the conduit 1, seals 7, so that to maintain said surface sealed on the work conduit 1 wall into which they rotate. Moreover they show, at every their quarter of circumference delimited by the vanes 40', 50', which are assembled on the respective shafts 40, 50, some loading cross joints 4 and some discharge cross joints 5, some arc-like slits 8 each one having a central angle of at least 60°. On both the surfaces of the work conduit 1 which are concerned with the slits 8 a hole 9 is made at diameter and lateral opposite positions. A vacuum pump (see FIGS. 2 and 3) is connected to each one of such holes 9.

Both the loading cross joint 4, and the discharge cross joint 5, rotate in a sealed way into their respective loading sealed cylinder 10 and discharge sealed cylinder 11 in the opposite sense to that of rotation of the preceeding and following respectively load bearing cross joints 2.

The loading sealed cylinder 10 communicates in its lower part in a concentric way, for almost all its length and for an arc of 80° to the work conduit 1 and it forms at its upper part a loading opening 12, having a length and width suitably fit to the purpose, anyway for an arc width not above 80°.

Such loading sealed cylinder 10 and its relative loading cross joint 4 assembled on it make up so inlet means with a rotatable door in the work conduit 1.

Between the work conduit 1 and the loading sealed cylinder 10 mantle, on two sides, there are suction opening 13 for the heat-exchange heat-conductor fluid, which openings are connected to a suction collector 14 (see FIG. 3) upstream of which there is a suitable aspirator (not represented).

It is contemplated that this last is connected to a thermically insulated electric filtering grid (not shown) having suitable size and capability, following which there is an intermediate heat-exchanger (not shown too) which is suitable to the purpose, herein the heat-conductor fluid is cooled and, almost cold, it is conveyed to a washing apparatus (not shown) from which it comes back to said heat-exchanger where it takes again a good part of the heat before released, then it is conveyed to the exchanger of a heat generator where it is heated up to a selected temperature and conveyed again to the work conduit 1 as it will be disclosed in the following, so realizing a recirculation and washing circuit for the heat-conductor fluid.

It is contemplated that in such recirculating circuit a supplying reservoir for the heat-conductor fluid is inserted, which reservoir supplying by request to the heat-generator heat-exchanger.

It is contemplated that on two walls, between the loading sealed cylinder 10 and the loading opening 12 a air delivery slit 15 is located on one side and an air suction slit 16 is located on the opposite side. Air is conveyed by means of a suitable compressor (not shown) towards the delivery slit 15 and it is sucked by the opposite slit 16, and it forms a true air barrier that will trail with itself eventual small portions of heat-conductor fluid, which has been contaminated during the device operation, so avoiding a possible pollution. The suitable aspirator, having suitable sizes and capabilities, conveys what has been sucked towards an air barrier burner (not shown).

The discharge sealed cylinder 11, having the same length and width as the loading sealed cylinder 10 disclosed above, communicates at its upper portion with the work conduit 1 and forms in its lower portion a discharge conveyor 17.

On two sides of the discharge sealed cylinder 11, where this cylinder is sealed to the lower end of the work conduit 1, there are delivery openings 18 for the heat-conductor fluid, which openings are connected to a delivery collector (not shwon) upstream of which there is a suitable compressor (not shown), whose suction opening communicates to said heat-generator exchange.

It is contemplated that the discharge conveyor 17 bears in its lower part a grid 19 suitable to collect the solder almost fluid that goes out from the device, when this device is used as an oven.

It is contemplated that on the two walls in the sense and between the discharge sealed cylinder and the discarge conveyor, so as between the loading sealed cylinder 10 and the loading opening 12, on one side an air delivery slit 15' and on the opposite side an air suction slit 16' are placed, so that they form here again an air barrier, this one also is supplied by means of a suitable compressor. Likewise the other one, this air suction slit also is connected to a fit aspirator (not shown), that conveys what has been sucked toward the air barrier burner. In this way it is avoided that the heat-conductor fluid which has been compressed into the work conduit 1 might escape outside the same.

Both the loading sealed cylinder 10 and the discharge sealed cylinder 11 bear upward openings, as well as downward for an arc width of 80°, therefore both the cross joints which rotate inside these, have arcs of 100° available which are opposite to one other, where they can realize their sealing function relative to the work conduit 1, with a remarkable safety margin, the single arcs in the shape of a cross joint being 90° wide.

The heat generator is provided with a main burner and a secondary burner, the former for the heating combustion and the second one acting as a burner of the supposed pulloted air, the whole being at a high temperature; all device parts which are concerned with high temperatures are suitably thermically insulated.

The loading cross joint 4, during its first fourth turn of rotation, encloses in a sealed way atmosheric air, on one hand, that afterward will be released at the next fourth turn, together with what has to be poured inside the work conduit 1, and on the other hand, heat-conductor fluid.

The discharge cross joint 5 encloses together with what it has to remove from the work conduit 1 the heat-conductor fluid and air from the opposite side.

So air and therefore oxygen would flow in the work conduit 1, as well as the heat-conductor fluid during the device operation which has been contaminated by the work conduit 1 would flow outside.

The arc slit in the fourths of sealed disks 6 and relative openings on the work conduit 1 walls communicating with the prearranged vacuum pumps, mentioned before, avoid the occurrence of what has been just illustrated. The pump employed for the heat-conductor polluted fluid conveys back this one to the work conduit 1, the pump employed for the air towards the environment conveys the same to the environment.

The structure and the operation of the device according to the teaching of this invention having been disclosed, now it will be disclosed a process for pre-treating electronic circuit scraps, which employs said device.

Figure 3:
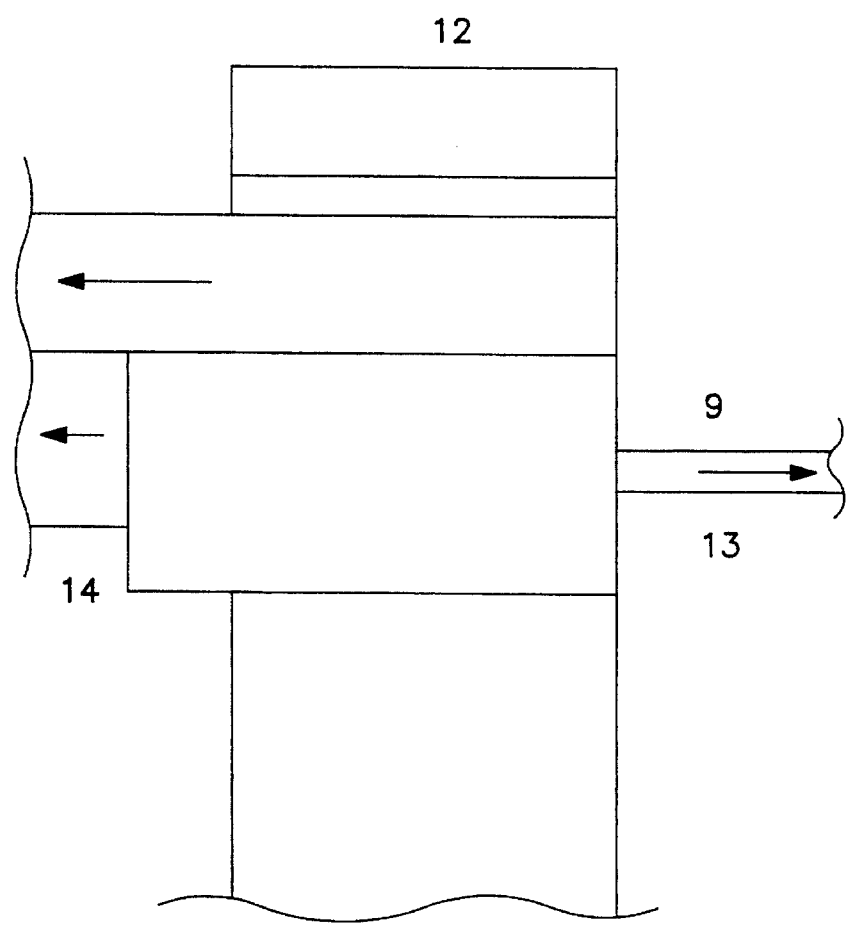
FIG. 3 is a view taken along the B oriented direction in FIG. 1.
Figure 4:
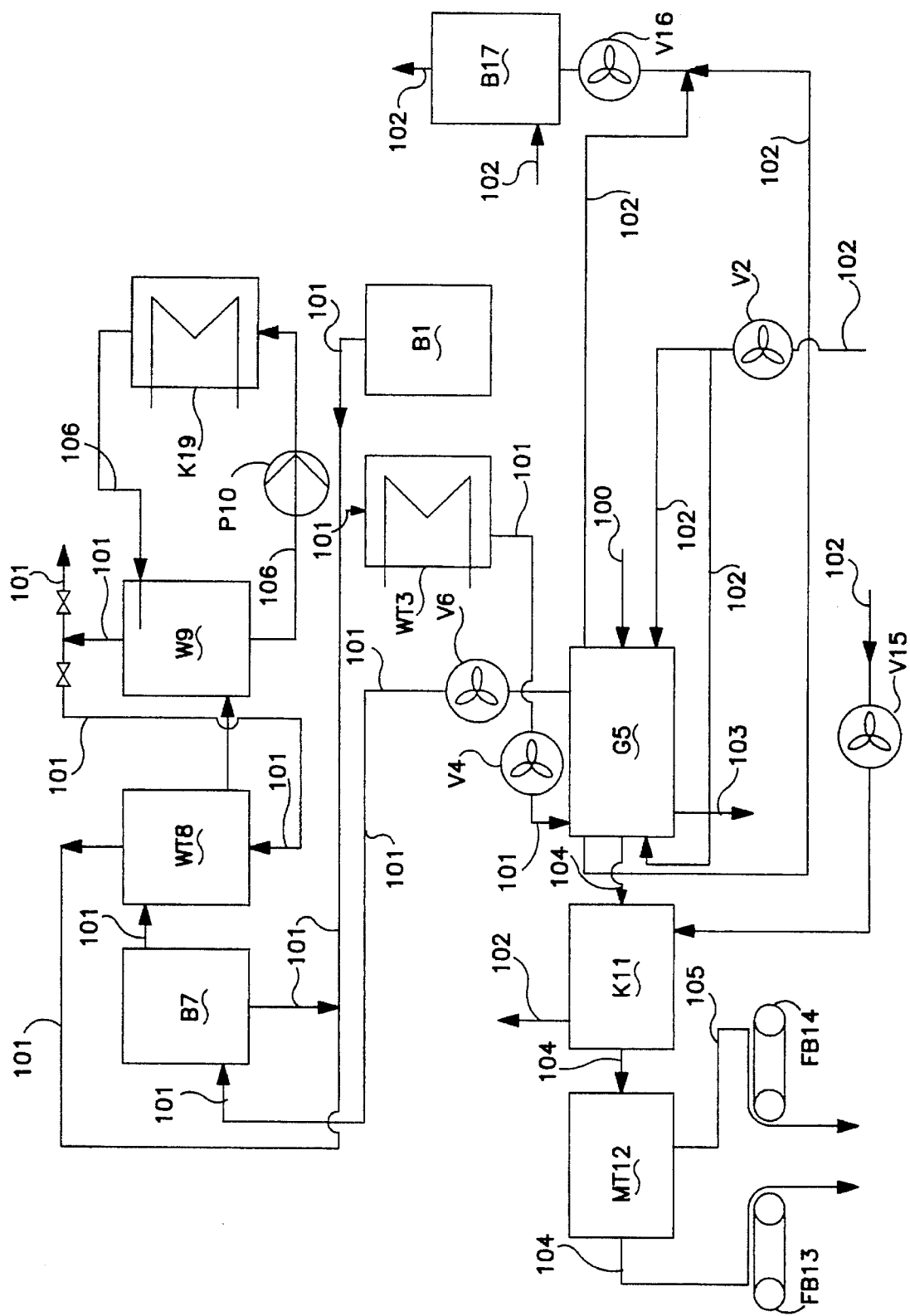
FIG. 4 is a schematic view of the process according to the present invention.

With reference now to FIG. 3, first of all we begin to replace the air present in an oven G5, made up of a device according to the present invention, with heat-exchange nitrogen, whose flow is indicated by the reference number 101, coming from a storage and delivery reservoir B1, inside which it is kept in a liquid state, through a heat-exchanger WT3. Nitrogen is supplied into the oven G5 by means of a pressure fan V4.

Nitrogen is employed as heat-exchange fluid for avoiding the danger of self-ignitions and explosions.

Nitrogen flows out the oven G5 through a suction fan V6 which conveys it to an electric thermoinsulated filtering grid B7, from which it passes to a heat-exchanger WT8 and from this one to a water washing tower W9. This tower delivers water, whose flow is indicated by the reference number 106, toward a refrigerator K19, from which water comes back to the same tower W9.

Nitrogen goes back from the washing tower W9 to the heat-exchanger WT8 and from this one it goes to the heat-exchanger WT3.

When it is sure that nitrogen has replaced all the air in the system, nitrogen is heated up to the operation temperature.

Once this temperature has been reached, one begins to supply electronic circuit scraps, scraps that have been made previously of substantially uniform sizes and are delivered into the oven G5, then one after the other all the components of the system will be delivered. It is to be understood that this will occur by automatism.

A heat-exchange fluid pressure measuring system, located between the compressor made up of the pressure fan VA and the heat-exchange fluid delivery die in the device, will provide, controlling a suitable solenoid valve, the flow of other nitrogen when this one is no longer sufficient in the system.

The occurrence of any irregularity in the system results in the immediate interruption of the heat-conductor fluid flow in the oven G5, as well as the immediate replacement of nitrogen already circulating in the system with fresh nitrogen coming from the storage reservoir of the same. This happens even when the system for any reason arrests or is arrested.

The contaminated nitrogen 101 sucked from the system is directly conveyed to a burner B from the washing tower W9.

Barrier air 102 is delivered at the oven G5 inlet and outlet by means of a pressure fan V2 and sucked from the oven G5 inlet and outlet by means of a suction fan V16, from which it goes to an electric grid filter and then to the burner B, where it will become combustion air. In such a way it is avoided that harmful vapor residues, even if in very small quantities, could be a source of atmospheric pollution.

At the oven G5 outlet there are on one side the solder 103, on the other side metals and plastic materials 104, going to the refrigerator K11 made up of a device according to the present invention, by means of a lifting device provided with suitable characteristics. In the refrigerator or K11 instead of nitrogen inside the work conduit 1 cooling air is delivered, coming from a suitable compressor made up of a pressure fan V15. The air 102 heated in the refrigerator K11 passes through the filter B17 and then to the burner B.

At the cooling device outlet plastic materials and metals go into contact with a magnetic drum MT12, next to which a conveyor belt FB13 follows for non iron metals and plastic materials, as well as another conveyor belt FB14 placed below the magnetic drum MT12, for iron metals, the whole having suitable sizes and capabilities to the functions developed by these.

A cooling machine has to maintain the liquid temperature of the washing system at a predetermined value.

The heat-conductor fluid, after washing passes to the heat-exchanger where it absorbs again a good part of heat before there released, afterward it goes to the heater heat-exchanger and, now being at a suitable temperature for accomplishing its functions, then it flows by means of the suitable compressor into the work conduit 1.

Stated that in the device for warm pre-treating electronic scraps it is to avoid in the most rigid way the danger of self-ignition or explosions, it is employed nitrogen as heat-conductor element and vector for gases which have been generated from scraps due to the heating to which the scraps are subjected.

The occurence of any irregularity in the system has as a consequence the immediate arrest of heat-conductor element delivery in the system, as well as the immediate complete substitution of the already circulating nitrogen in the system with "fresh" nitrogen coming from the storage reservoir of the same. This also happens when the system for any reason arrests or is arrested. Dirty nitrogen sucked from the system is directly conveyed to the barrier air burner in the heat generator where it is burnt, therefore it is cleaned.

System apparatuses and the connection conduits form together a sealed system. The only points where escapes from the circuit or omissions inside it could occur are the loading opening and the discharge conveyor of the device. Even if in these points some escapes would occur, the foreseen expedients make these escapes absolutely harmless.

To operate the device, firstly one starts to replace air present in the system with nitrogen; this nitrogen, coming form a reservoir where it is maintained in the liquid state, flows to the whole made up of apparatuses and conduits from a connection device located before the heat generator exchanger.

Once it is sure that nitrogen has replaced all the previously contained in the system air, one starts to heat this nitrogen up to the operation temperature. Once it is reached this temperature, one starts to get operative the scraps delivery mechanism, which scrap previously made almost uniform in size enters in the device; then, one after the other, all the system components are successively supplied. It is stated that all this occurs automatically. A pressure measuring device of the heat-conductor element, that is placed between the compressor and the delivery die thereof in the device, takes care of delivering other nitrogen, controlling a suitable solenoid valve, to the device when nitrogen is no longer enough.

Scraps that have remained in the device for the necessary time once they have entered onto the cooling device they will go out the device flowing into the magnetic drum, wherein they will be removed from its iron part; the remaining part by means of a belt conveyor is conveyed and then delivered in a device for metal-containing sludge washing. The plastic materials which together with the sludge residue leave the device will be processed so as to can re-employ them.

From the oven G5, in the meantime the solder in a semi-fluid state will have been removed through the already predetermined way for it.

This invention has been disclosed and illustrated with reference to a specific embodiment of the same, but it is to be expressly understood that the details set forth are given just as exemplification and a considerable width of modifications, additions and/omissions is possible, without departing from the scope of the original teaching that has been presented. Therefore, the protection scope of the present invention is intended to be limited just by what is defined in the appended claims.

I claim:

1. A device for pre-treating electronic circuit scraps, characterized in that it comprises:

a conduit (1) placed at a slope to the vertical direction, said conduit having inside a plurality of grid-like vane disk wheels (2) which are arranged in a cascade from an upper end to a lower end of said conduit (1) and are counter-rotating;

means for introducing the scraps into an inlet at the upper end of said conduit (1);

said conduit (1) also including a loading rotatable door (4) which is assembled in a loading cylinder (10) that has an upper opening and a lower opening which cause one and only one sector of said rotatable door (4) to communicate simultaneously with the outside of said conduit (1), and another sector and just this other sector of said rotatable door (4) to communicate with the inside of said conduit (1);

a loading opening (12) which communicates with said upper opening of said conduit (1);

outlet means for the electronic circuit scraps which have been already processed at the lower end of said conduit, said outlet means including a discharge rotatable door (5) which is assembled within a discharge cylinder (11) that has an upper opening and a lower opening which cause one and only one sector of said rotatable door (5) to communicate simultaneously with the inside of said conduit (1) and another sector and just this other sector of said rotatable door (5) to communicate with the outside of said conduit (1);

a discharge conveyor (17) which communicates with said lower opening of said discharge cylinder (11);

means (8, 9) for removing air introduced from the outside of said conduit (1) through said rotatable doors (4, 5);

means for introducing heat-exchange fluid through said rotatable doors (4, 5) into the inside of the conduit (1) during operation; and means (13, 18) for circulating the heat-exchange fluid from the lower end to the upper end of said conduit (1).

2. A device for pre-treating electronic circuit scraps according to claim 1, wherein said disk wheels (2), said loading door (4), and said discharge door (5) bear four vane (20'; 40'; 50'), each one being assembled in a shape of a cross joint on respective rotating shafts (20; 40; 50).

3. A device for pre-treating electronic circuit scraps according to claim 2, wherein said vanes (20') are in a swastika shape whose sense is opposite to that of rotation.

4. A device for pre-treating electronic circuit scraps according to claim 1, wherein said disk wheels (2) rotate within the full space inside said conduit (1).

5. A device fore pre-treating electronic circuit scraps according to claim 1, wherein baffles (3) are arranged below each one of said disk wheels (2).

6. A device for pre-treating electronic circuit scraps according to claim 1, further characterized in that between said loading opening (12) and said loading cylinder (10) of said conduit (1), an air barrier (15, 16) is supplied, and characterized in that an air barrier (15', 16') is supplied between said discharge conveyor (17) and said discharge cylinder (11) of said conduit (1).

7. A device for pre-treating electronic circuit scraps according to claim 1, wherein said discharge conveyor (17) is equipped with means (19) for collecting solder employed for electronic circuits, and also with means for conveying plastic materials and metals.

8. A device for pre-treating electronic circuit scraps according to claim 1, further characterized in that it comprises a circuit means (B7, WT8, W9, WT3) for recirculating and washing (W9) the heat-exchange fluid towards said conduit (1).

9. A device for pre-treating electronic circuit scraps according to claim 8, further characterized in that a fresh heat-exchange fluid reservoir (B1) is located in said recirculating circuit means.

10. A device for pre-treating electronic circuit scraps according to claim 1, wherein said heat-exchange fluid is nitrogen.

11. A device for pre-treating electronic circuit scraps according to claim 1, wherein said heat-exchange fluid is air.

12. A process for pre-treating electronic circuit scraps, comprising the steps of:

I) carrying out a treatment of the scraps within an oven (G5) inside a conduit (1);

II) carrying out a treatment of plastic materials and metals obtained from the scraps at an outlet from the conduit (1) in a refrigerator (K11);

III) burning outlet air; and

IV) burning outlet heat-exchange fluid.

\* \* \* \* \*